United States Patent
Hulet et al.

(10) Patent No.: US 9,098,939 B2
(45) Date of Patent: Aug. 4, 2015

(54) SYSTEM AND METHOD OF GENERATING LIGHT MAPS

(75) Inventors: Scott S. Hulet, Wadsworth, OH (US); Stephen A. Curless, Canton, OH (US); Este-Lela F. Curless, Canton, OH (US); John J. Burky, Uniontown, OH (US)

(73) Assignee: Lockheed Martin Corporation, Orlando, FL (US)

(*) Notice: Subject to any disclaimer, the term of this patent is extended or adjusted under 35 U.S.C. 154(b) by 2315 days.

(21) Appl. No.: 11/998,737

(22) Filed: Nov. 30, 2007

(65) Prior Publication Data

US 2008/0158244 A1 Jul. 3, 2008

Related U.S. Application Data

(60) Provisional application No. 60/867,984, filed on Nov. 30, 2006.

(51) Int. Cl.
| | |
|---|---|
| G06T 15/50 | (2011.01) |
| G06T 11/20 | (2006.01) |
| G06T 15/20 | (2011.01) |
| G09B 9/30 | (2006.01) |
| G09B 29/00 | (2006.01) |

(52) U.S. Cl.
CPC .............. *G06T 15/205* (2013.01); *G06T 15/50* (2013.01); *G09B 9/30* (2013.01); *G09B 29/007* (2013.01)

(58) Field of Classification Search
None
See application file for complete search history.

(56) References Cited

U.S. PATENT DOCUMENTS

| | | | |
|---|---|---|---|
| 2004/0047518 A1* | 3/2004 | Tiana | 382/284 |
| 2005/0195096 A1* | 9/2005 | Ward et al. | 340/995.14 |
| 2006/0036425 A1* | 2/2006 | Le Cocq et al. | 703/22 |
| 2006/0158881 A1* | 7/2006 | Dowling | 362/231 |
| 2006/0239583 A1* | 10/2006 | Safonov | 382/274 |

OTHER PUBLICATIONS

Flowchart for method of creating light maps for an out-the-window display.

* cited by examiner

*Primary Examiner* — Tize Ma
(74) *Attorney, Agent, or Firm* — Withrow & Terranova, PLLC

(57) ABSTRACT

A method and system for generating light maps for use with an out the window, or a night vision goggles display utilizes inputs from a variety of different geographical and structural data sources. These data sources are then used to determine the locations of structures, roads, and areas of interest within a selected land area. Realistic light maps can then be created quickly and automatically.

20 Claims, 13 Drawing Sheets
(5 of 13 Drawing Sheet(s) Filed in Color)

SYSTEM AND METHOD OF GENERATING LIGHT MAPS

CROSS-REFERENCE TO RELATED APPLICATION

This application claims the benefit of the filing date of U.S. Provisional Application Ser. No. 60/867,984 filed Nov. 30, 2006 and entitled "System and Method of Generating Light Maps". The '984 application is hereby incorporated by reference.

FIELD

The present invention is directed to a system and method employing luminance terrain light-maps that allow simulations to be carried out in a more immersive, realistic and dynamic manner than those that are able to be carried out by existing protocols.

BACKGROUND

The artificial rendering of an environment as seen by different types of sensors typically requires the implementation of dozens of types of special effects that, if not present, subvert the validity, and thus the value of the simulation. In order to portray a realistic simulated environment, the visual system used in connection with a simulation will need to possess the ability to generate effects such as: surfaces illuminated by the sun or moon depending on their position, the effects of various weather conditions, and illuminated colored surfaces representative of the temperature of ambient illumination present.

Concurrently, the electro-optical system of an effective simulation should be able to present features including: sensor gain representative of current scene illumination; gain related noise levels representative of the current scene illumination level; the reflective properties of materials with respect to the appropriate frequencies of light; proper panchromatic interpretation of visual colors; sensor exposure latitude limitations; illuminated surfaces affected by the position of the moon and other luminous objects; and lens flaring and light point haloing based off of the physical properties and emittance of the luminous object.

Often times certain simulations require an infrared system in order to portray a realistic environment. In order to be effective, such infrared systems should be able to present features including: proper panchromatic interpretation of visual colors (near-IR); proper representation of thermal properties of scene objects (far-IR); appropriate emittance properties for materials used in the database; heating and cooling related thermal properties; and sensor blooming representative of exposure latitude limitations of the sensor. In addition, simulated radar systems, both synthetic aperture and real-time, should be adapted to present: proper reflectance and absorption characteristics for all materials in the database; proper emitter source occulting and entity shadowing; and entity orientation based reflectance variations.

General effects require only simple mathematical calculations to accomplish. For example, illuminated surfaces that must emit without the need to cast light on non-luminant surfaces can be calculated similarly to simple surfaces possessing only reflective properties. Similarly, sensor gain effects need only average the scene illumination detected by the sensor being simulated and adjust the scene luminosity gamut accordingly. More dynamic effects however require more involved physics computations. For example, proper rendering of typical point light sources in visual and electro-optical simulations will require light halos, light blooming, scene gaining, point streaking, blockage near IR objects, reflections and light cast on non-emissive sources, to name a few.

The implementation of all requisite effects on all applicable objects in a simulation database naturally requires considerable amounts of computational time. With this in mind, many tactical real-time simulations can require the scene to be redrawn a minimum of sixty times each second, the minimal accepted rate considered to be imperceptible to most humans. Given the current state of graphics technology, or even that projected for the near future, those requisites cannot be met by the existing state of the art given the computational time required to calculate and render the physical properties of required effects for a minimal acceptable level of entities in a particular scene. FIG. 1 hereof is a flow diagram of one prior art method of generating a light map for an out the window display.

The success of a simulated training environment relies upon the simulation to immerse the trainee to the extent that they believe they're within the established environment. The most immersive effects however tend to also be the most prohibitively expensive, and thus computationally speaking, they are typically omitted from various simulations. This greatly limits the effectiveness of the immersive properties of a simulation, particularly at night.

There is thus a continuing need to improve the quality of optical effects so as to enhance the effectiveness of a given simulation.

It would also be desirable to shorten turnaround time in creating light maps to reduce delays in being able to implement a training program or practice an exercise. Typically, manually placing all the light points, adjustments, and other enhancements takes approximately three months.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
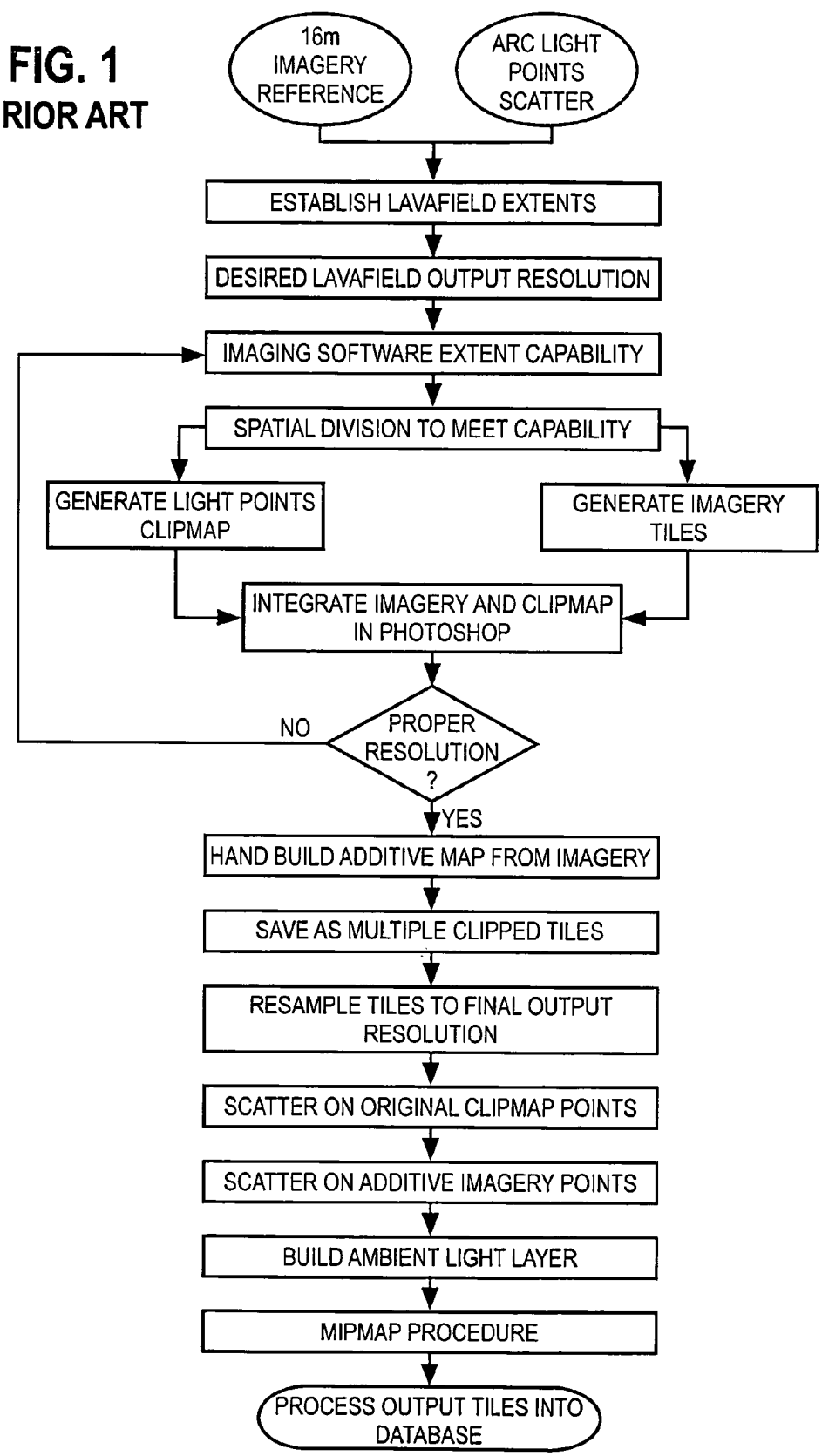
FIG. 1 is a flow diagram of a prior art process of creating light maps.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Different aspects of the invention provide for luminance terrain light-maps for different visual environments. In one aspect of the invention, light-maps can be generated to simulate the effect that lights and their emittance have on night-vision goggles (NVG's) with a particular focus on realistic levels of ambient illumination pooling and the congealing specific to the goggles when high levels of illumination sources are present in a scene. In a second aspect, the light-maps simulate the appearance of a realistic number of visual out-the-window (OTW) point lights and their associate ambient light pools, which result in the glow witnessed after twilight in more developed urban areas.

In disclosed embodiments, these two types of terrain light-maps employ the same type of construction and implementation techniques, but feature processing, specific to each, which results in successful creation of the respective effect that is seen in connection with a respective simulation. Specifically, luminance terrain light-maps in a disclosed embodiment utilize 6 layers of USGS DLG data: loose surface roads, paved roads, primary highways, dual highways, interstates and a points coverage to correlate with models included in the database; and also utilize 5 layers of USGS NLCD data: airfield geometry, commercial/industrial areas, high residential areas, low residential areas and urban grass areas. These areas are then manipulated volumetrically and with volumetric boolean operations to derive spatial areas of data applicability, with consideration to their use for either visual or sensor systems.

Database OTW imagery is then selected using the specific data layers, filtered using the boolean derived layers, and manipulated using standard Photoshop toolset filters to achieve a desired effect appropriate to the data type and the light-map being produced. Random noisification is employed to further filter selected imagery to randomly 'turn off' pixels within the selection, as 100% of lights in the real world are never illuminated simultaneously. Where applicable, gaussian blurring and image pixel multiplication are used to create 'glowing' areas and street networks not already defined with point lights by the database construction are scattered with a seeded realistic interval to form intelligent road networks obvious to the observer. Additionally, colorization is employed, based off of observed real-world luminance characteristics, to impart appropriate colorization to OTW light-map areas of illumination.

The luminance terrain light-maps of the present invention address the technological inadequacies with existing and future hardware as well as present cost limitations by intelligently pre-rendering many of the simulated effects into a simple rasterized image that can then be more cheaply (computationally speaking) applied to a simulated scene. Accordingly, the present invention activity enables that which has not been possible in the past for wide area databases. Indeed, the light-maps of the present invention not only enable a simulated scene to possess literally millions more light points and illuminated faces than were possible before, but also permits light from simulated database point sources to illuminate other objects within the environment. This capability has, in the prior art, only been available with more than a dozen predetermined sources (i.e. aircraft landing lights). Because light-maps generated in accordance with present processing are so effective at simulating a large scale environment in a realistic and inexpensive manner, the thousands of light points that were employed, in prior art processes, to represent an urban area during a simulation, can now be eliminated. The resources required to produce those lights can be reallocated to other areas of scene enhancement.

Precise correlation is typically of paramount importance on most, if not all simulation programs. Thus in addition to enabling simulations to be entirely more immersive, realistic and dynamic than they've previously been, the luminance terrain light-maps of the present invention are built utilizing open source (where available): USGS NLCD (aerial coverage such as commercial, residential, industrial, park and forest areas) and DLG (linear coverage such as interstates, highways, roads, interchanges and railway features). These features enable the light-maps to closely correlate to the real-life imagery, so that the luminance characteristics of features within a particular environment appear in the correct vicinity. In addition, the light-maps of the present invention enable cultural models placed within a selected scene to correlate perfectly (since the point placement vectors are converted to raster and used as an input to the process).

The overall cost to generate an immersive simulated environment is always a primary concern. For this reason, luminance terrain light-maps according to the present invention can be constructed using developed procedures implemented through publicly available ArcInfo.aml scripts and Adobe Photoshop actions. These programs provide nearly full automation for the production of the light-maps and are portable to other image manipulation applications (assuming they meet certain minimal requirements of functionality). As a result, high resolution terrain light-maps can be produced, in accordance herewith, in just a few days instead of the months that would be otherwise required to accomplish the procedure/techniques in a manual fashion. Utilizing the present invention, it is no longer cost prohibitive to build realistic effects into all areas of the synthetic environment or simulation area.

According to an embodiment of the present invention, an NVG light-map, an OTW light-map, or both light maps can be created with a set of input files. In an embodiment, if the user desires creating both kinds of light-maps, then the OTW light-map is created first, goes first since some files created by the OTW process may be used for inputs into the NVG process.

Figure 2:
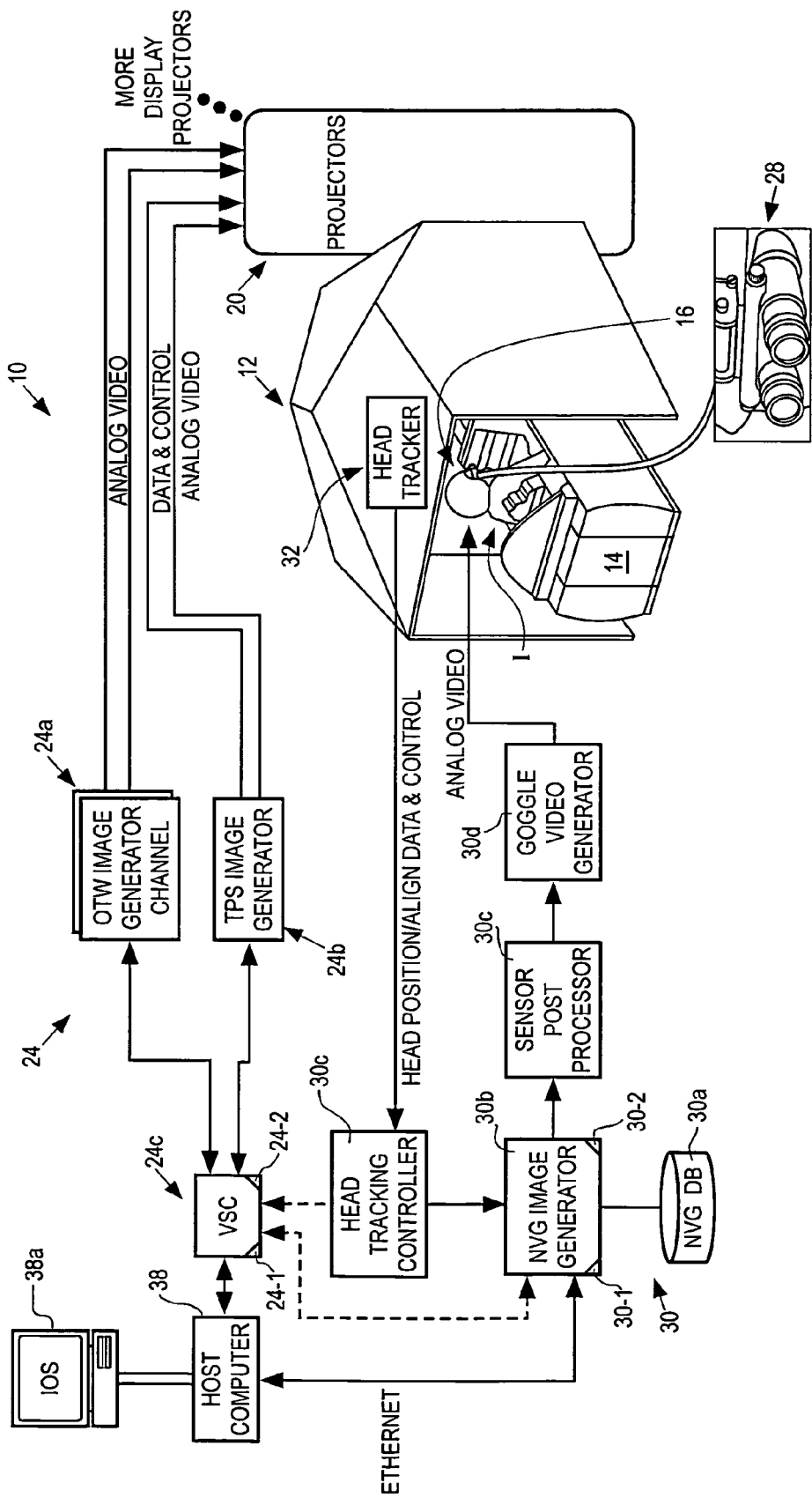
FIG. 2 is a block diagram of a system which embodies the invention.

FIG. 2 illustrates a simulator system 10 which embodies the present invention. The system 10 includes a mock-up 12 for a cockpit of a selected aircraft. System 10 can be used to train pilots to fly a particular aircraft, or, for rehearsing a mission. Those of skill in the art will understand that the particular details of the mock-up 12 are not limitations of the invention.

Mock-up 12 includes a seat 14 for the individual I using the system 10. Control/instrument displays 16 driven by a subsystem 24 having image or display projectors 20 present real-time information to the individual I as to performance of the aircraft being simulated. In addition, projectors 20 present a simulated out the window (OTW) display to the individual I. The projectors 20 are driven by image generators 24a, b. Images from projectors 20 can be presented on simulated cockpit windows to duplicate the scenes visible to the individual I when flying over a particular terrain.

As an alternate to a direct out the window view, the individual I can view the scene using night vision goggles (NVG) 28 to enhance his/her night vision. Goggles 28 are driven by a subsystem 30 which includes a night vision database 30a, which can be implemented with a magnetic or optical disk drive which carries stored information, a night vision image generator 30b, a post processor 30c and a goggle's video generator coupled to the goggles 28.

Light maps can be pre-stored in subsystem 24 and/or 30. These can be retrieved and presented in out the window or night vision goggles displays.

A head tracking controller 30e is coupled both the image generator 30b and to a head tracker 32 which provides feedback as to location and orientation of the head of individual I. The controller 30e is also coupled to a video system controller 24c which provides head location information to the image generators 24a, b to properly reflect orientation of the individual's head relative to the out the window displays and to the control/instrument displays 16.

A supervisory host computer 38 is coupled to controller 24c and to image generator 30b. An operator input/output interface device 38a, which might be a personal computer with a keyboard and a two dimensional visual display can be used by a trainer to configure and manage the training secession.

Those of skill will understand that display systems 24 and 30 can be implemented with one or more programmable processors in combination with executable software to present various out the window and night vision enhanced images. Processors 24-1 could execute software 24-2 stored on one or more computer readable mediums such as semiconductor storage, magnetic storage or optical storage. Such software could, for example, be stored in any of units 24a, b, or c and executed by one or more processors located therein all without limitation. Similarly, one or more processors 30-1 and associated executable software 30-2 could be included in image generator 30b or in one or more of post processor 30c and generator 30d all without limitation.

The simulation experience can be enhanced, in accordance with the present invention by the generation and presentation of pre-defined, enhanced light fields as described below. Such processing can be implemented by various combinations of the processors and executable software as noted above.

Embodiments of the invention can be coded in non-platform-specific, publicly available, languages, for example Javascript.

Figure 3:
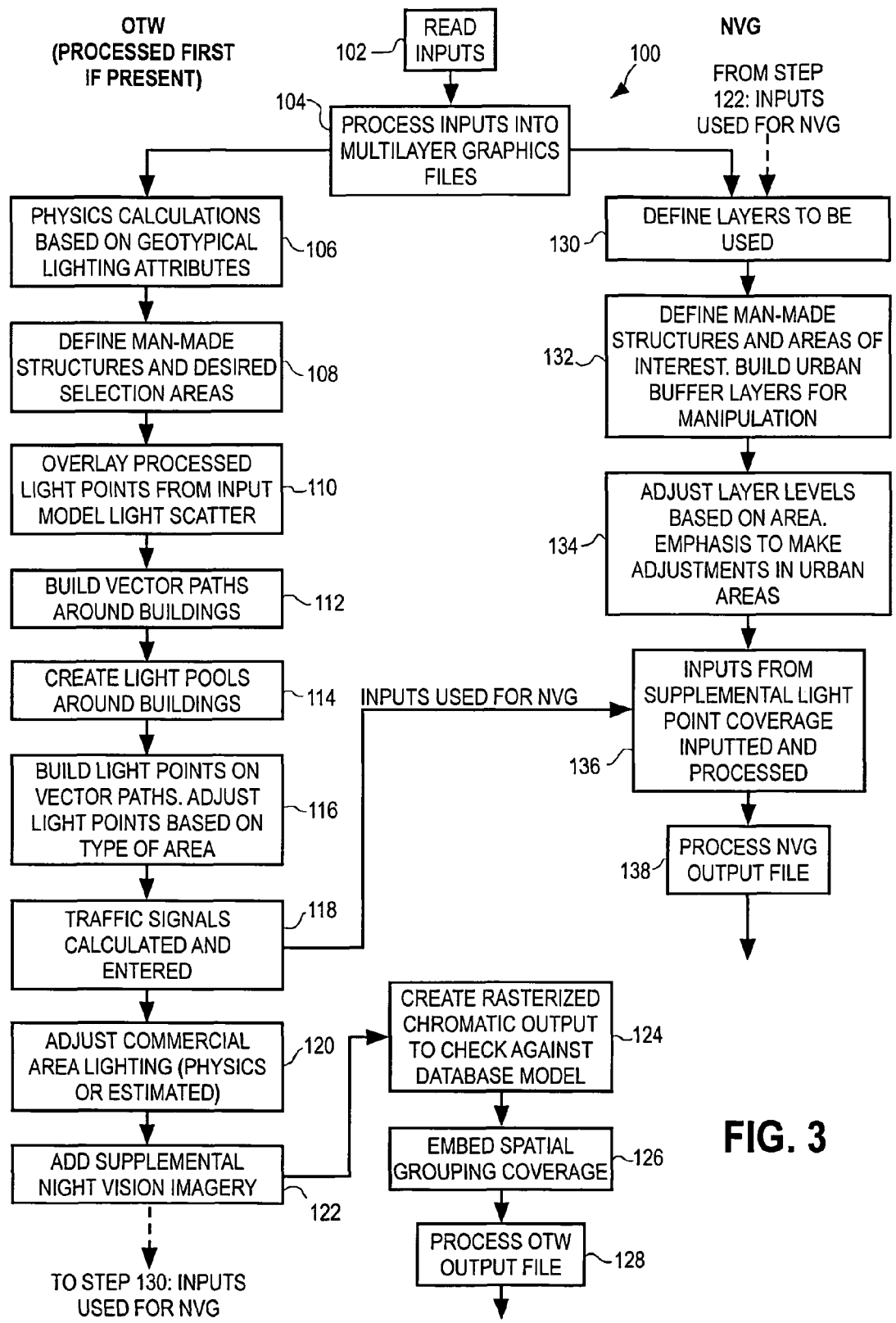
FIG. 3 is a flow diagram of a method in accordance with an embodiment of the invention.

FIG. 3 is a flow diagram of a method 100 of processing OTW and NVG light maps in accordance with an embodiment the invention 100. At step 102, the inputs are read by the system. In an embodiment, the system is adaptable to receive inputs of many different types. One skilled in the art would appreciate that the increased amount of input data resulting from increasing numbers of inputs will generally result in a more detailed resulting light-map; however, it is not required that every input be present in order to generate a light map. Any combination of these inputs can be used to create a light map.

Exemplary inputs that can be used in the system include, but are not limited to, digital line graph (DLG) files, which are digital vector representations of cartographic information provided by the United States Geological Survey, Multi-Resolution Land Characteristics (MRLC) coverages, which are land-cover databases created by a various government industries, imagery data point lights coverage inputs, Federal and State government Geographic Information Systems GIS infrastructure data, which are government databases that display geographically-referenced information, night imagery data, spatial grouping coverage data, which is data pertaining to related infrastructure groupings, such as city blocks that go dark when power plants are hit, enhanced vectorized/lineal point data, such as user-edited or user-enhanced data, and enhanced land use/material coded rasters, which is data describing the material description of areas, such as which areas are made of dirt, asphalt and concrete.

In some embodiments, the described method is modular. Consequently, some steps are optional and do not need to be performed in order to generate a light-map. Further, some steps may be dependent upon the presence of specific input types. If these input types that are manipulated by certain steps are unavailable, then those steps are not performed, but those steps are not essential to the process. One skilled in the art would appreciate that some of the steps in the following flowchart are optional in creating either OTW or NVG light maps.

Figure 4A:
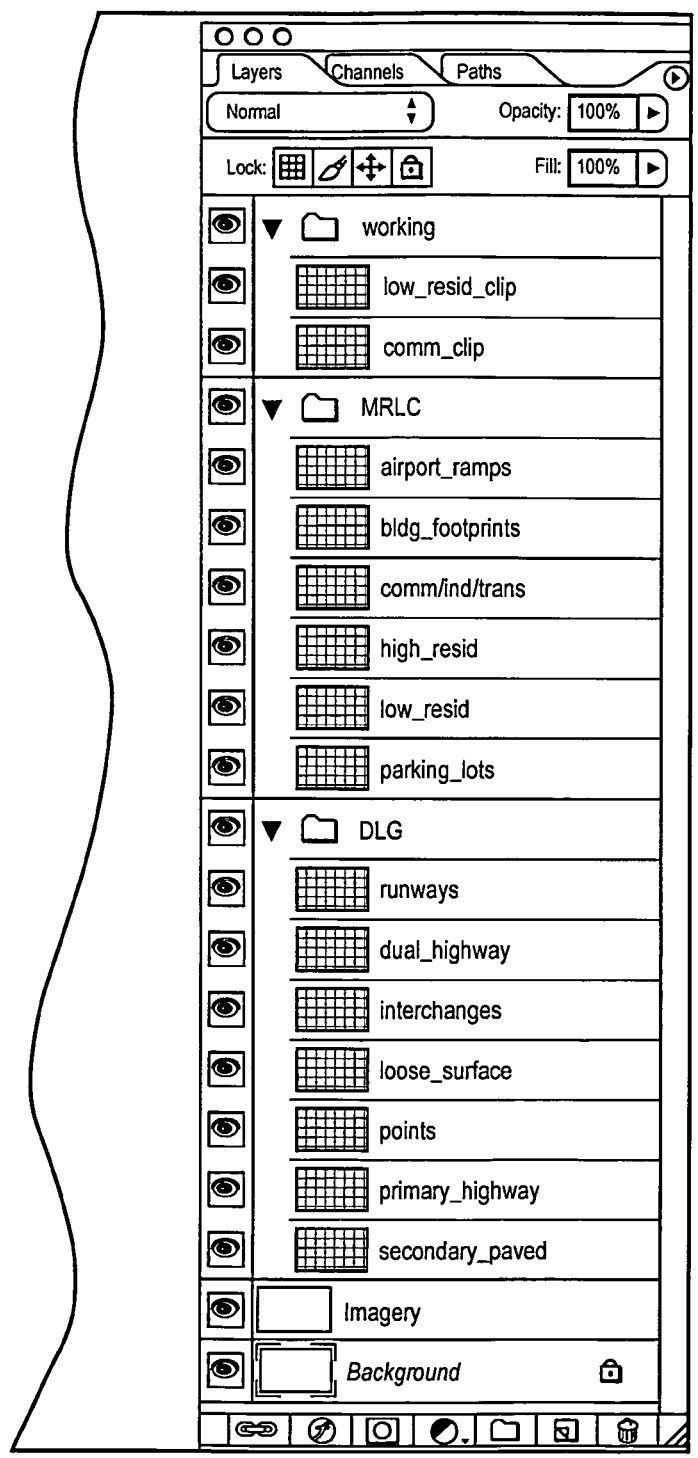
FIG. 4A-4K illustrate various aspects of the steps of the FIG. 3 in accordance with an embodiment of the invention.
Figure 4B:
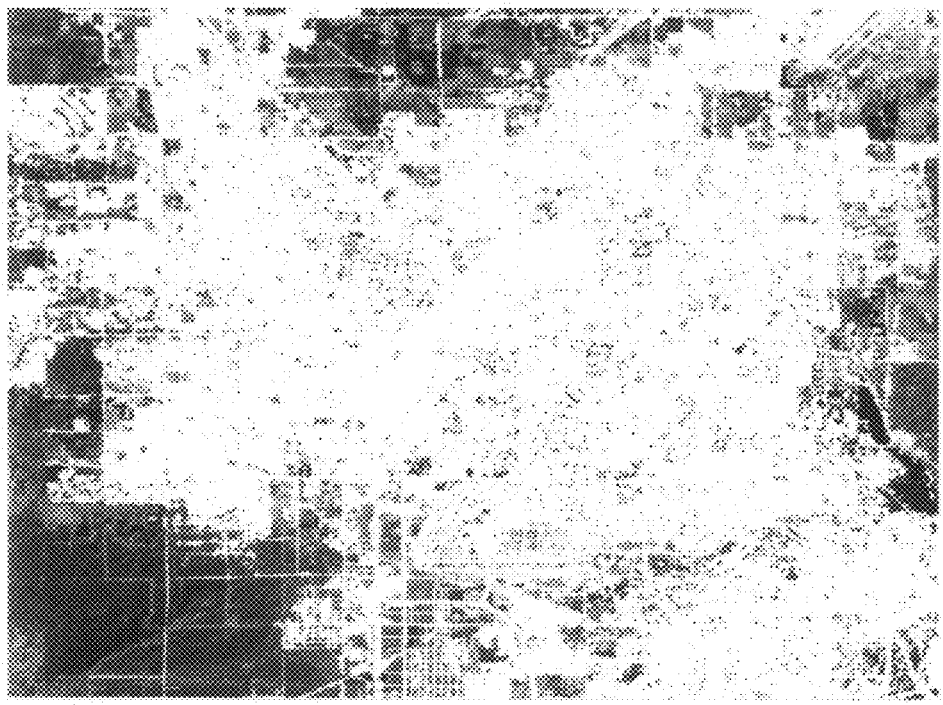
Figure 4C:
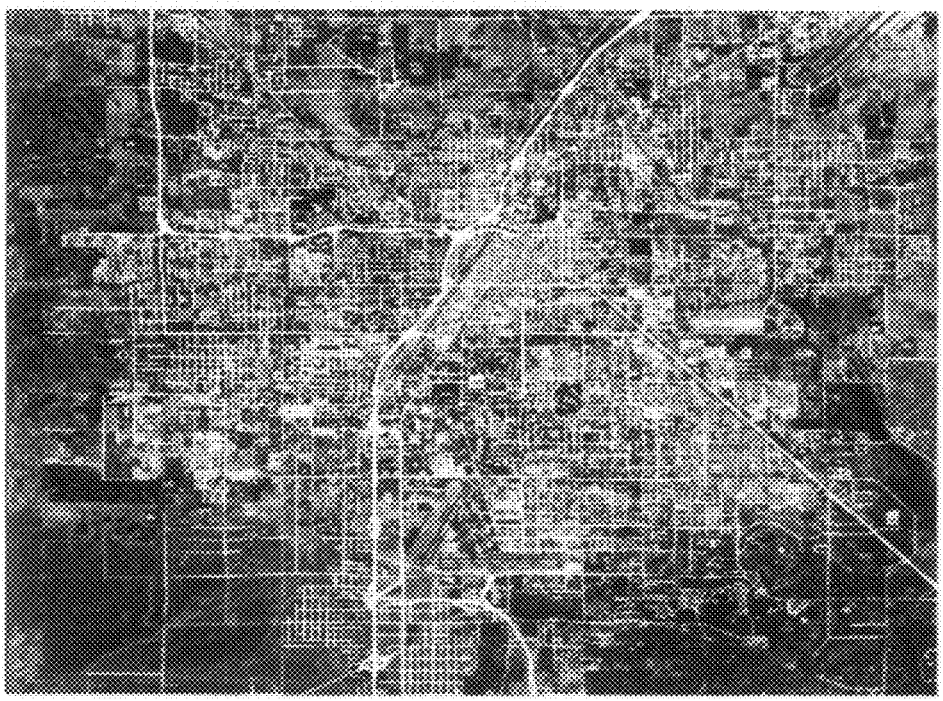
Figure 4D:
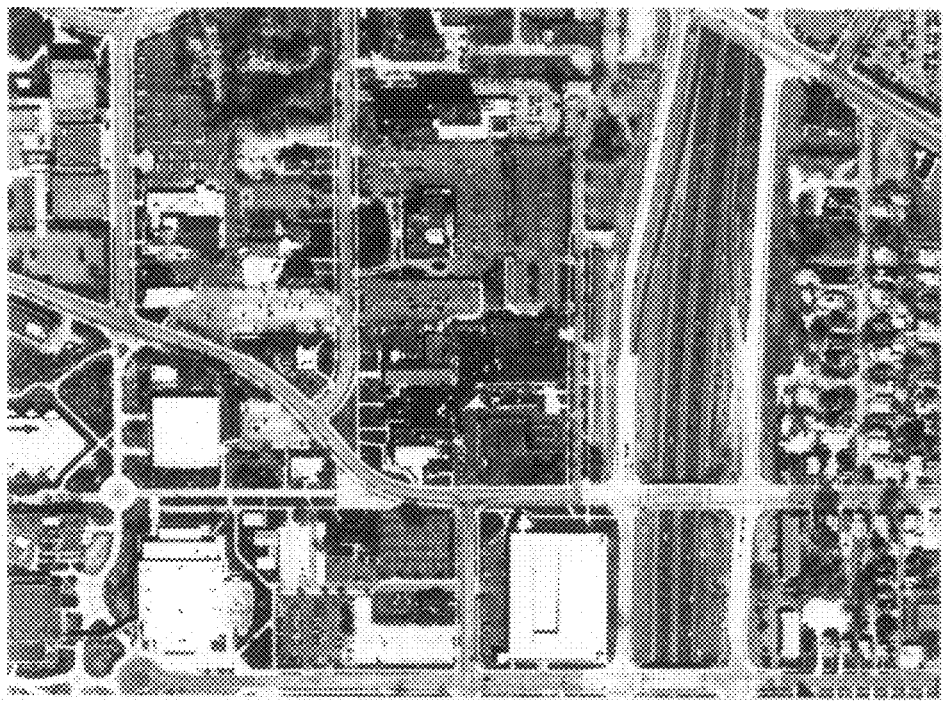

At step 104, input files to be used for the desired simulation area are processed. A workable combination file for use with the desired graphics program is created. Preferably, the graphics program to be utilized is capable of layering. Such programs are commercially available and need not be discussed further. An exemplary illustration of this step is shown in FIG. 4A, which is a screenshot showing all input data loaded into layers in the working combination file to be processed. FIG. 4D is an example of input imagery. FIG. 4B illustrates digital land use data overlayed on input imagery in the image tool's graphical window. FIG. 4C illustrates digital line data overlayed on input imagery in the image tool's graphical window.

Figure 4E:
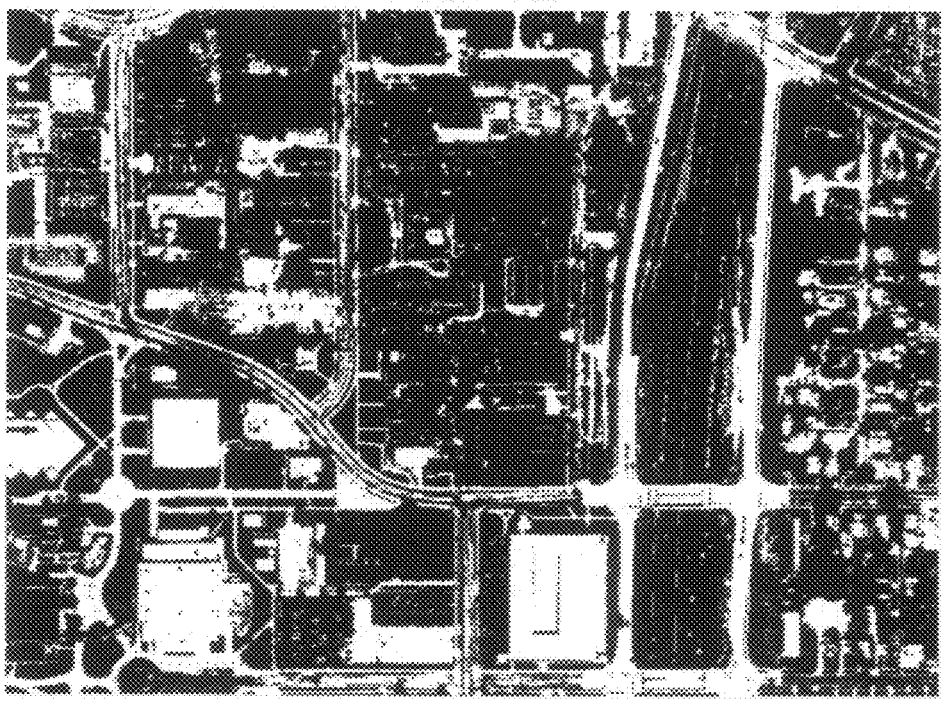

In some embodiments, it is desirable to adjust the resolution of the imagery for easier manipulations. For example, it may be desirable to process input imagery to a 1 bit image so that man-made structures are more isolated and easily extractable using digital land-use data. FIG. 4E is an example of input imagery processed to a 1 bit image.

At step 106, optional physics calculations based on surfaces are made. Exemplary surfaces include, but not limited to, building materials and ground surfaces. In an embodiment, physics data regarding the surfaces must be available in order for this step to be performed. In another embodiment, physics calculations can be made on assumed surface data. In yet another embodiment, the physics calculations are optional and do not need to be implemented.

The physics module operates, in an embodiment, as follows. The physics module would take data passed to it from the imagery process possibly containing information such as, ground material, light filament type, light fixture/lens type, light wattage, and fixture height above ground. The following could then be derived: lighting color/spectrum via table lookup from filament type; emissivity/radiance values calculated from wattage data; line-of-sight attenuation calculated from emissivity, spectrum (for atmospheric attenuation), fixture/lens type, and ground material type (for diffuse scatter determination) to determine local area diffuse illumination on trees/buildings; size/shape light pool characteristics on the ground derived from emissivity (brightness), fixture/lens type (pool shape, transition gradients, field intensities), height above ground (pool size, transition gradients), and ground material type (for diffuse scatter characteristics)

The functional mathematical models would then consist of a set of constants for spectrum values, a set of attenuation constants for atmosphere, and a set of equations associated with fixture/lens types, preferably a double integral describing an intensity field.

The module would calculate two solutions, one for ambient spill, and another for direct illumination. Ambient spill would be calculated from diffusion/reflection from the ground material (derived from direct illumination, modulated by ground material), and atmospheric diffusion variables. Direct illumination would be calculated from a field intensity double integral bounded by the pool's extents, themselves derived geometrically using height above terrain and beam-spread data. Then, the resultant field intensity would be modulated by an atmospheric attenuation constant, modified by spectrum, and further modulated by height above terrain factored into the inverse square law.

At step 108, a process to define a desired selection of urban areas is performed. In order to perform this process of determining urban areas, a group of buildings are selected, and the selection is expanded to create groupings of closely grouped areas. Roads are then overlaid and trimmed to fit the urban area selection. This selection is shrunk to remove areas with more sparse development, such as more rural areas. Finally, the selection is then re-expanded to encompass as much of the desired data to retain as practical. This selection is used to remove the outlying areas that will not be designated as "urban" areas. Road data is removed from this urban area so that the user can select and differentially manipulate only the buildings in the urban area. The locations for traffic signal placement are also established at this step. An exemplary method to perform this step, including establishing traffic signal placement, is illustrated in more detail in FIGS. 5 A-X.

At step 110, input light point data is used to identify where light points are located. Since in reality, lights pools are not cut off but rather attenuate as the distance from the light point increases, this effect must be rendered in the light map. Consequently, the intensity of light must be gradually decreased as the distance from the light points increases. Further, not only do specific light points have to be attenuated, but the simulation of an ambient surface layer of light must be created over the appropriate (usually urban) areas and attenuated as desired. In an embodiment, placement of light points can be estimated based on the type of area where the light points are to be added.

Figure 4F:
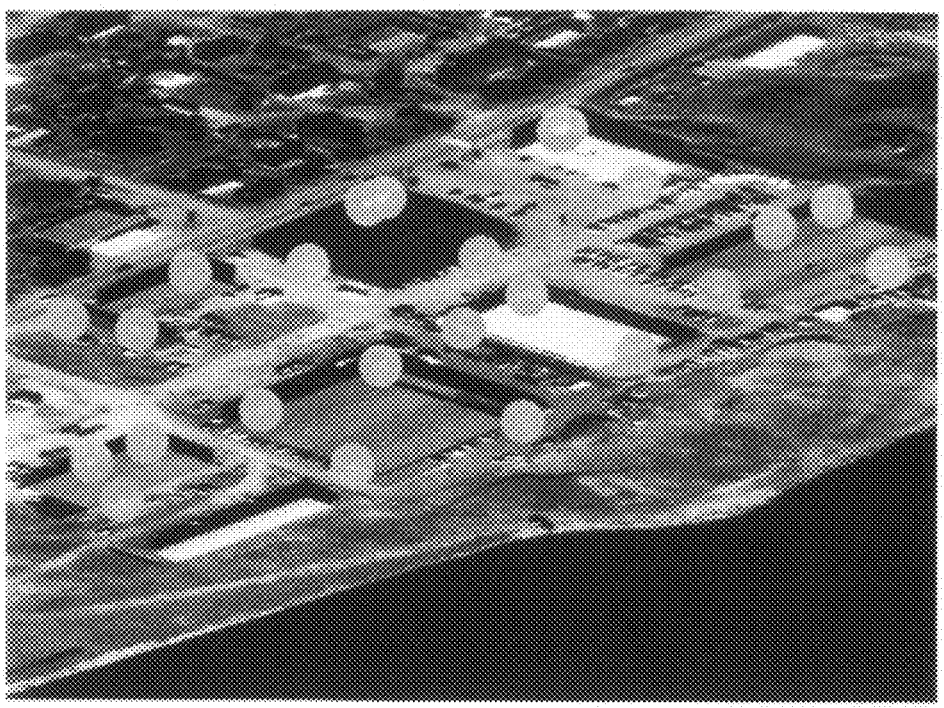
Figure 4G:
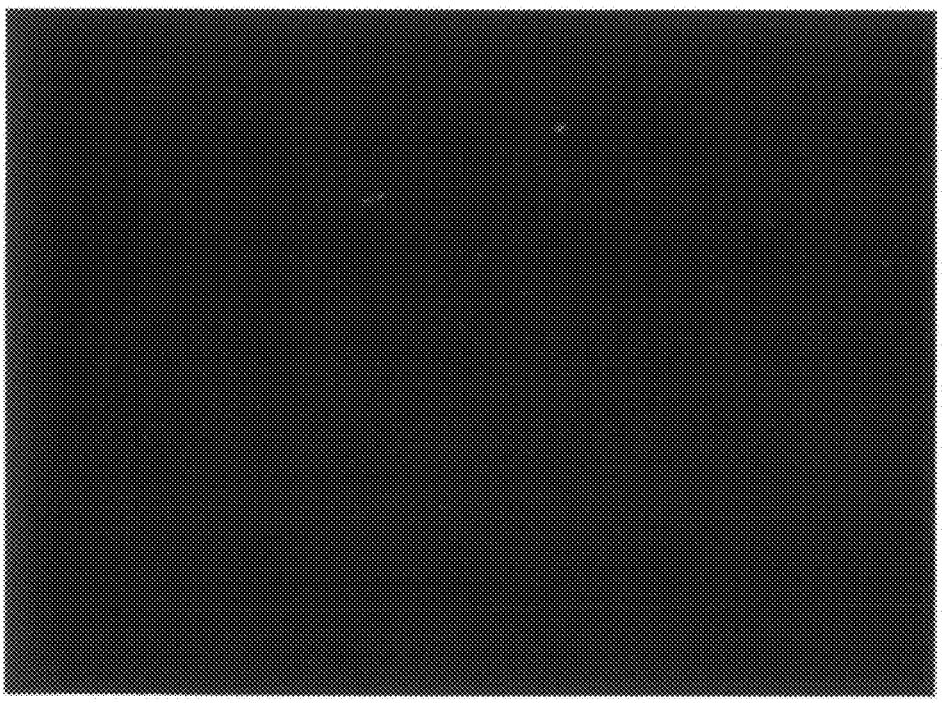
Figure 4H:
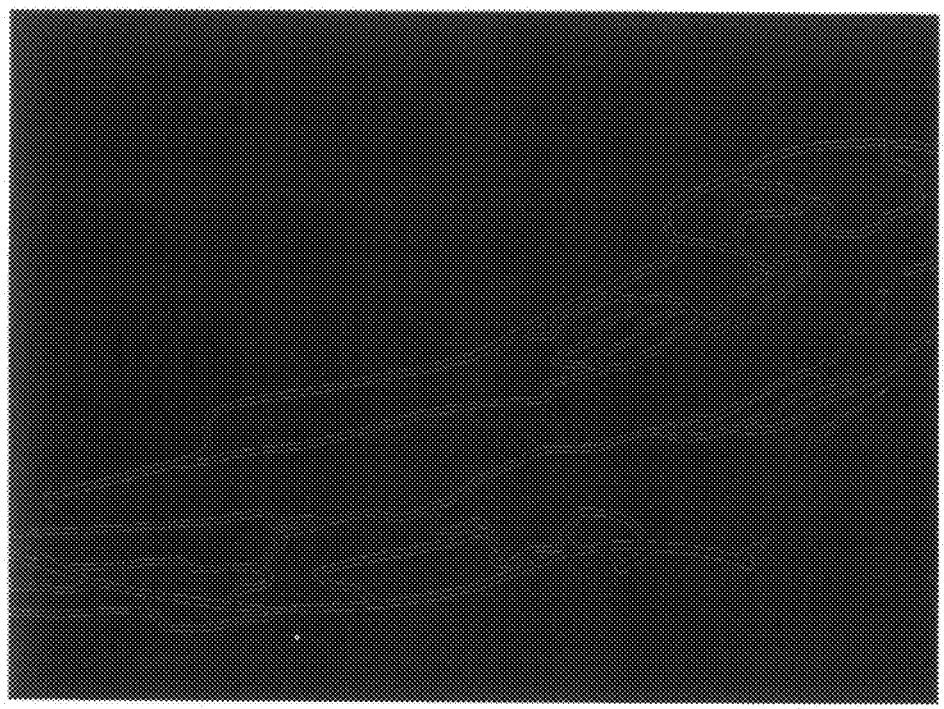
Figure 4I:
Figure 4J:
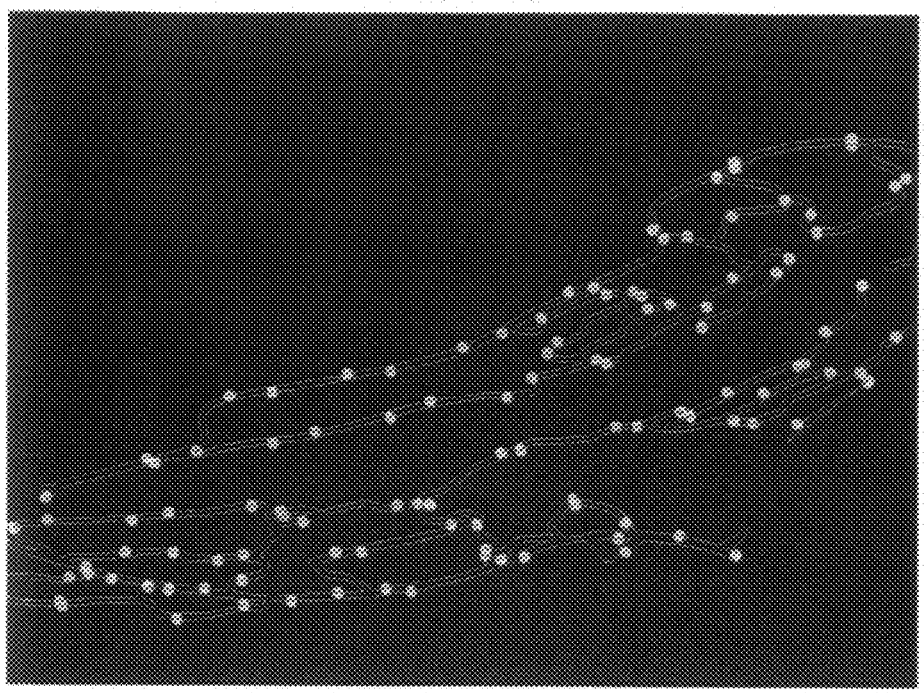
Figure 4K:
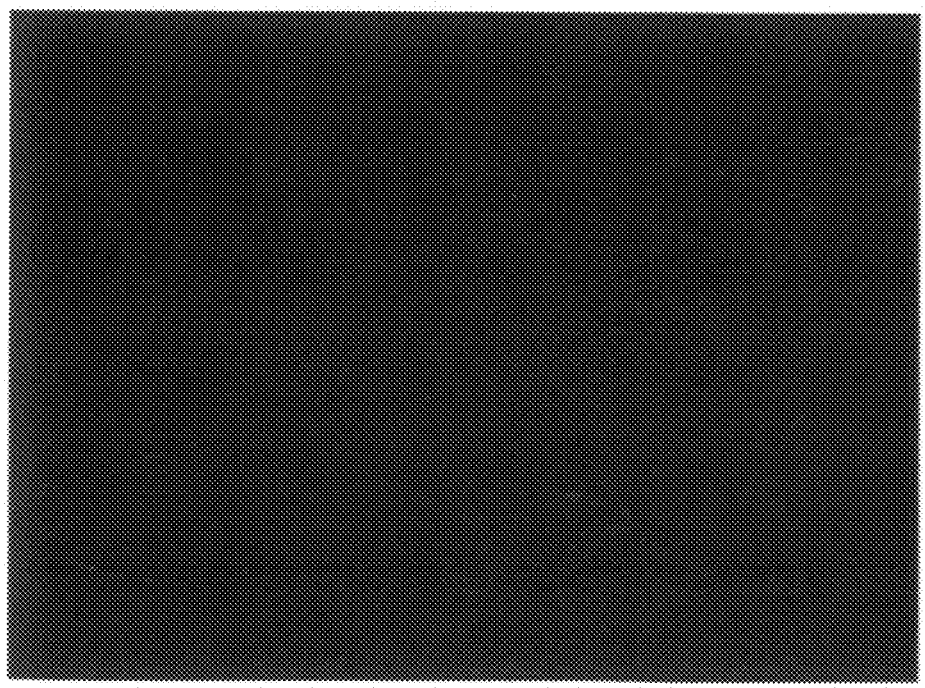

At step 112, vector paths are built around desired structures. As one of ordinary skill in the art would appreciate, these vector paths are created around the structures so that "brushes" can be used to quickly place objects, such as light points, with consistent attributes along vectors. FIG. 4H is an example of road data that has been vectorized. FIG. 4I is the vectorized road data overlaid with imagery in order to show correlation between the vectorized roads and the roads appearing in the imagery. FIG. 4J shows light points that have been derived from the vectorized roads, and finally FIG. 4K shows light pools generated from the light points.

At step 114, light pools are created around the buildings in the urban selection defined in step 108. This may involve first placing light points around buildings, and then generating light pools from the light points. Since step 108 involves creating a workable urban area of building rasters, light points can be placed around these building rasters. The generated light pools can be circular-shaped, but do not extend into any area defined as a building. Alternatively, the light points and/or light pools can be placed using vector paths. FIG. 4F shows light points being placed around buildings, and FIG. 4G shows light pools generated from those light points.

At step 116, light points are planted along vector paths according to desired "brushes". For example, light points of specific densities are planted at specific intervals along certain interstate highways. These light points are then adjusted, including being attenuated properly. The characteristics of the lights can be either based on the assumed characteristics, or, the characteristics of the lights can be calculated with physics calculations if the appropriate data is available.

At step 118, traffic signals, if desired, are placed on the light-map at the locations calculated in step 108. After step 118, the current file can be saved for use as an additional input in the creation of an NVG light map, if desired.

At step 120, the lighting in commercial areas is adjusted. Lighting in commercial areas is often created by many light sources of different kinds, resulting in more complex light patterns. Therefore, lighting in commercial areas often benefit from added light adjustment to compensate for these many variables. Commercial areas may include, for example, malls, parking lots, recreational fields, and industrial areas. Adjustments to these areas involve editing lighting characteristics that are typical to the specific sort of area, including increasing or decreasing the density of lights customary to specific types of areas. Also, darkening areas which are usually not lit, such as rooftops or expanses of grassy areas, occurs at this step.

Additional adjustments of light pools cast by light sources occurs at this step. Since the attributes of the light pools on the ground cast by light sources differ in size, shape, intensity and color depending on variables such as the height and type of the light source, adjustments to the light pools must be made to reflect these variables. These adjustments can be made based on estimated values.

Alternatively, if physics data is available, either as an alternative or a supplement to the estimated characteristics, one of ordinary skill in the art will appreciate that the system may use physics calculations to determine the lighting effects of commercial areas. Desired input data for physics calculations may include data about the type of material on the ground that the light pool falls on, since, for example, light shining on dirt reacts differently than light shining on concrete.

At step 122, if night vision imagery is available, the system can incorporate night vision imagery to supplement the existing model. After step 122, the resulting file can be used as the input, or a supplementary input, into creating an NVG light-map, if desired. The input would be used in step 130.

At step 124, a rasterized chromatic output is created to check the model against the database. A rasterized chromatic output is an output file comprising digital representations of the color shades in the model. The rasterized chromatic output can be used to verify the colors in the model against the colors in the database to determine if a realistic model has been created, and/or to detect discrepancies.

At step 126, the spatial grouping coverage is implemented into the structures. Structures may be associated with certain spatial groups of buildings that affect each other. For example, if a power plant is destroyed, the buildings associated with that spatial group, for example buildings powered by that power plant, will go dark, increasing realism of the simulations.

At step 128, the OTW file is processed for output. The output file may need to be adapted to run on a specific image generator (IG) if desired. Consequently, an embodiment of the present invention is adaptable for use with any IG, and therefore is not platform-specific. The output file could be stored on any computer readable medium and used by the image generator to present an out the window display during a simulation.

Step 130 is the first step of the sub-process for creating an NVG light map. In an embodiment of the invention, either an NVG output light map, an OTW output light map, or both light maps can be created. Also, according to an embodiment, if both light maps are created, then the OTW light map is created first, files created after steps in the OTW light map can be used as inputs to the NVG light map. For example, the file created after step 122 may be used as an input for step 130. Therefore, depending on whether an OTW light map has been created, step 130 may not involve all the steps as would be required if the NVG light map was the only light map being created. In step 130, the system defines the layers created in step 104 to be used with the NVG output.

At step 132, a process to define a desired selection of urban areas is performed. In order to perform this process of determining urban areas, a group of buildings are selected, and the selection is expanded to create groupings of closely grouped areas. Roads are then overlaid and trimmed to fit the urban area selection. This selection is shrunk to remove areas with more sparse development, such as more rural areas. Finally, the selection is then re-expanded to encompass as much of the desired data to retain as practical. This selection is used to remove the outlying areas that will not be designated as "urban" areas. Road data is removed from this urban area so that the user can select and differentially manipulate only the buildings in the urban area. The locations for traffic signal placement are also established at this step. An exemplary method to perform this step, including establishing traffic signal placement, is defined in more detail in FIG. 5A-X.

At step 134, light pools are created around buildings identified in step 132. This may involve first placing light points around buildings, and then generating light pools from the light points. Since step 132 involves creating a workable urban area of building rasters, light points can be placed around these building rasters. The generated light pools can be circular-shaped, but do not extend into any area defined as a building. Alternatively, the light points and/or light pools can be placed using vector paths. FIG. 4F shows light points being placed around buildings, and FIG. 4G shows light pools generated from those light points. Further, the characteristics of any lights can be either based on the assumed characteristics, or, the characteristics of the lights can be calculated with physics calculations if the appropriate data is available. If desired, the characteristics of these lights can be adjusted at this step. For example, lights located around buildings may undergo adjustments to more accurately reflect the effects of lights in urban areas.

At step 136, the file created at OTW step 118 can be used as an additional input for the NVG system. The output file is used to create a rasterized supplemental lightpoint coverage file. This supplemental lightpoint file is adjusted prior to its input into the working NVG light map file. The lights on the supplemental lightpoint are adjusted and attenuated based on the coverage area. If there are too many lights, then they can be randomly reduced to enhance realism. These light points are inserted into the working NVG light map file.

Also at step 136, final adjustments to lighting effects are made to improve realism. Variables such as brightness levels and contrast are adjusted based on the area that the light point is located. Adjustments such as color shifts and saturation adjustments to build a more cohesive picture are also made at step 136.

At step 138, the NVG file is processed for output. Specific format edits may need to be made depending on the desired Image generator (IG) that it will be used with. In this way, the current invention is adaptable to any IG, and therefore is not platform-specific. The output file could be stored on any computer readable medium and used by the image generator to present a goggles display during a simulation.

Figure 5A:
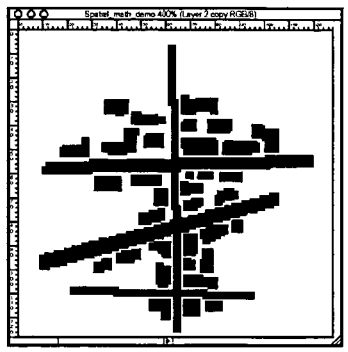
FIGS. 5A-5X illustrate the process of defining selections of workable urban areas in accordance with an embodiment of the invention.
Figure 5B:
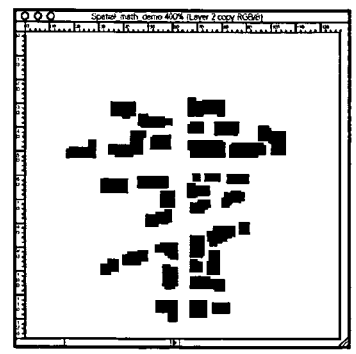
Figure 5C:
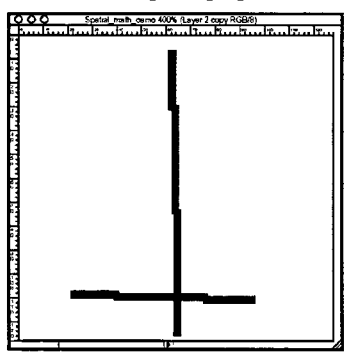
Figure 5D:
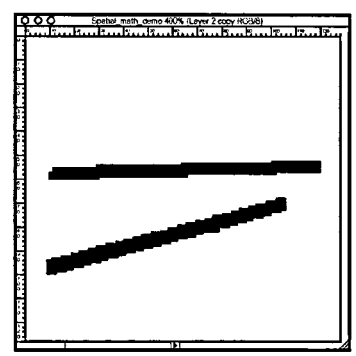
Figure 5E:
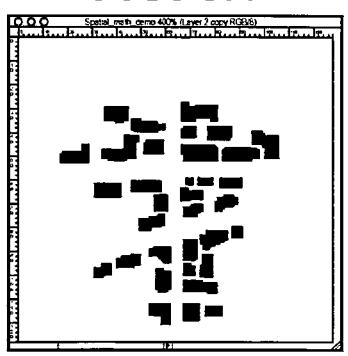
Figure 5F:
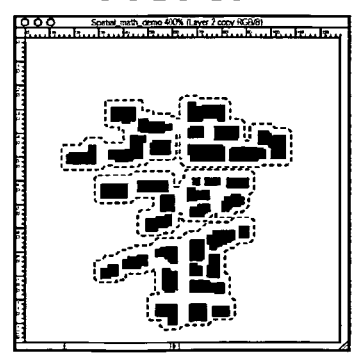
Figure 5G:
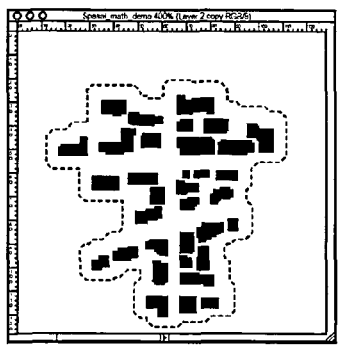
Figure 5H:
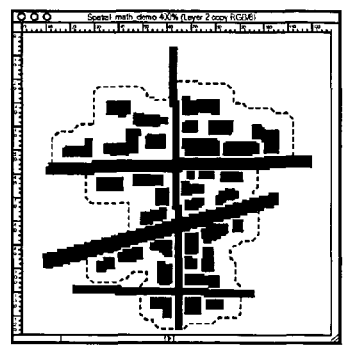
Figure 5I:
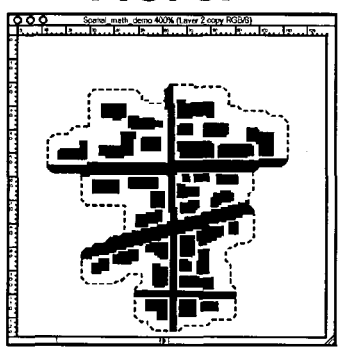
Figure 5J:
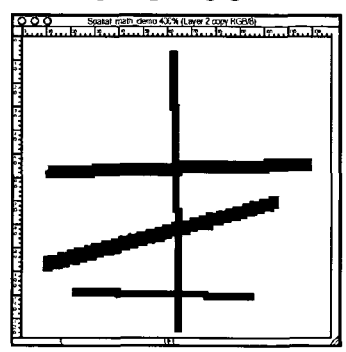
Figure 5K:
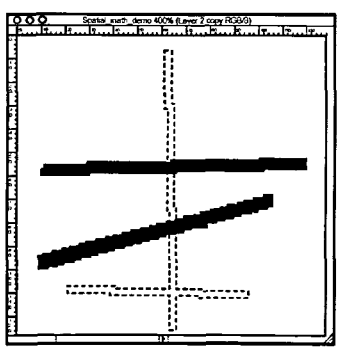
Figure 5L:
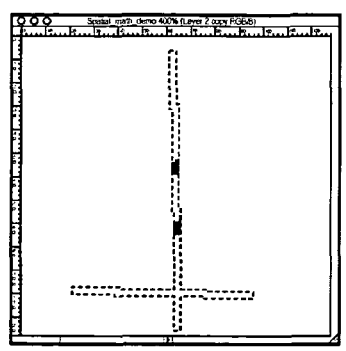
Figure 5M:
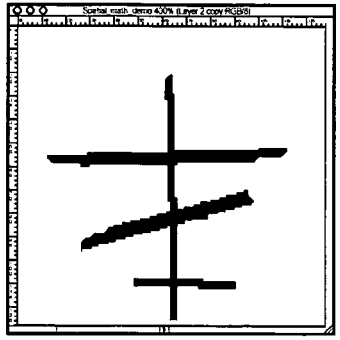
Figure 5N:
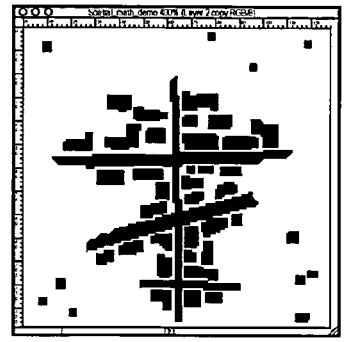
Figure 5O:
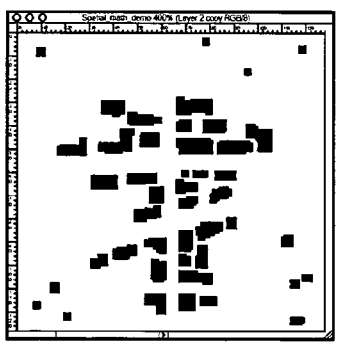
Figure 5P:
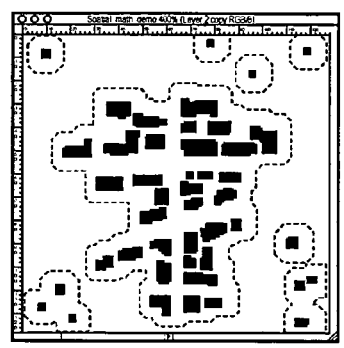
Figure 5Q:
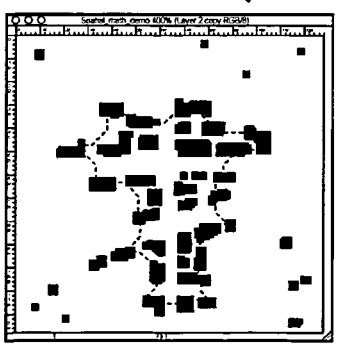
Figure 5R:
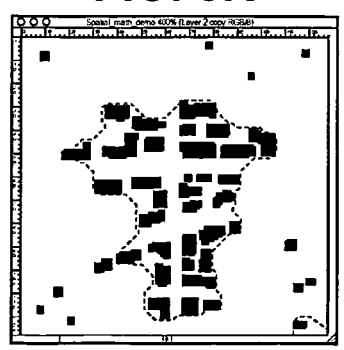
Figure 5S:
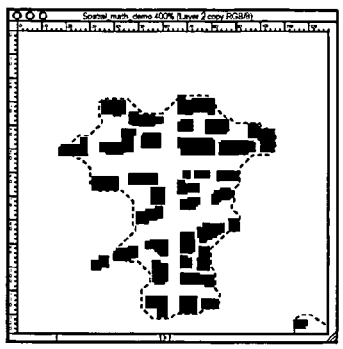
Figure 5T:
Figure 5U:
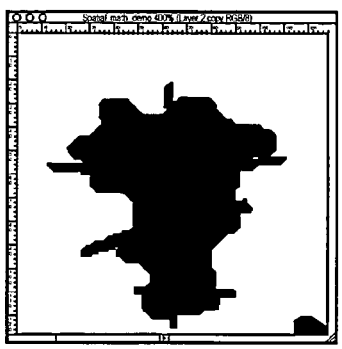
Figure 5V:
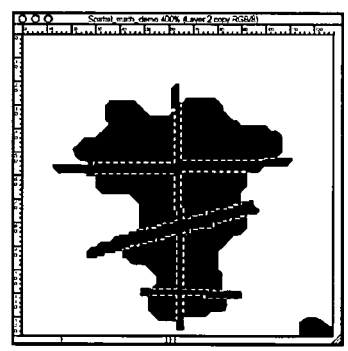
Figure 5W:
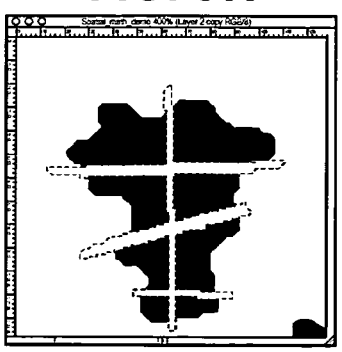
Figure 5X:
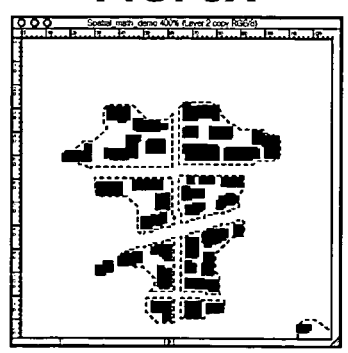

FIGS. 5A-5X illustrate a process of defining a desired selection of workable urban areas in accordance with an embodiment of the invention. Creating a workable urban area allows the user and/or program to manipulate lighting effects in these areas only, which tend to be more complex than lighting effects in less-populated areas.

In FIG. 5A, an exemplary working city area showing all data layers is shown. In FIG. 5B, the exemplary working city area shows only the building data. This building data may be derived from MRLC databases. FIG. 5C is the same exemplary working city area with only the minor roads showing, and FIG. 5D is the same area with only the major roads showing. The road data shown in FIGS. 5C and 5D may be derived from DLG databases.

In order to create the workable urban area, the building data is first selected as shown in FIG. 5E. Then, the selected building data is expanded to help group buildings that are in close proximity together, as shown in 5F. This selection is expanded even further in order to capture the entire urban area, as shown in FIG. 5G. Major and minor roads are then overlaid on the selection in order to show the spatial relationships between the buildings and the roads, as shown in FIG. 5H. The roads are then trimmed to fit the urban area selection, as shown in FIG. 5I.

The locations of traffic signals, if desired, can then be determined, as shown in FIGS. 5J-5M. In some embodiments, the determination and placement of traffic signals is optional. The first step in this process is selecting only roads, as shown in FIG. 5J. Next, a selection based on one type of road is made to determine its point of intersection with another type, as shown in FIG. 5K. For example, it may be desirable to select the intersections for all roads except for the intersections with smaller roads, as shown in FIG. 5L. These derived intersections are then overlaid with the road layers, as shown in FIG. 5M. These are the intersections for traffic signal placement at step 118.

The urban selection process continues with a process to remove smaller outlying urban areas so that they do not stand out as much as the denser urban areas, increasing realism. All the data is shown for orientation, as shown in FIG. 5N. The step illustrated in FIG. 5N may be performed after the step illustrated in FIG. 5M or, if traffic signals are not desired, this step may be performed after the step illustrated in FIG. 5I. All the urban data is selected, as shown in FIG. 5O. Next, the urban area is expanded to create groupings for closely grouped areas, which are ideally more developed areas, as shown in FIG. 5P. The selection is then shrunk to smaller than its original value in order to remove areas with more sparse development, which are ideally those areas that are more rural as shown in FIG. 5Q. The selection is then re-expanded to encompass as much of the urban areas as desired, as shown in FIG. 5R. This resulting selection can be used to manipulate urban areas without touching undesirable outlying areas, as shown in FIG. 5S.

FIGS. 5T-5X show the steps to create a selection of only buildings in urban areas. In FIG. 5T, all data layers are shown for orientation. The selection of urban areas as shown in FIG. 5S is selected and filled, as shown in FIG. 5U. This selection is overlaid with a selection of the trimmed road data, as shown in FIG. 5V. The road data is deleted from the filled urban selection, and the resulting geometry can then itself be selected for manipulation, as shown in FIG. 5W. The resulting building-only urban selection is shown in FIG. 5X, which can be used to manipulate urban buildings specifically without roads.

Any of the selections created in the process as illustrated in 5A-5X can be selected and used for manipulation if desired. For example, if the user wishes to manipulate the light above an entire urban area, then the selection as illustrated in step 5S can be used. If the user wishes to manipulate the light around buildings in urban areas only, excluding roads, then the selection as illustrated in FIG. 5X can be used.

Alternate embodiments of the invention may include creating an NVG light map from an OTW light map. This may involve, for example, grey-scaling a 24-bit file to an 8-bit file. Next, special selections and filters are executed to produce the desired lighting effects that are common to specific areas in an NVG scene. For example, the ambient lighting effects that occur when viewing a scene through night vision goggles, masses of light in areas such as dense urban areas and along major roads, and shimmering light effects.

From the foregoing, it will be observed that numerous variations and modifications may be effected without departing from the spirit and scope of the invention. It is to be understood that no limitation with respect to the specific apparatus illustrated herein is intended or should be inferred.

It is, of course, intended to cover by the appended claims all such modifications as fall within the scope of the claims.

The invention claimed is:

1. A method of constructing a luminance terrain light map of a region of interest comprising:
   accessing, by a computing device, region imagery of the region of interest;
   accessing, by the computing device, lineal data that identifies a location of a plurality of roads in the region imagery;
   accessing, by the computing device, area data that identifies a location of at least one urban area in the region imagery;
   based on the lineal data and the area data, selecting a plurality of spatial areas of imagery from the region imagery that depict the plurality of roads and the at least one urban area; and
   generating, by the computing device, the luminance terrain light map of the region of interest using the plurality of selected spatial areas, by:
      identifying a plurality of light point image locations in the plurality of selected spatial areas that identify locations of lights in the selected spatial areas; and
      for each of the plurality of light point image locations:
         defining a light pool image region at the each light point image location; and
         brightening the light pool image region such that the light pool image region is brightened with respect to other image portions outside of the light pool image region.

2. A method as in claim 1 which includes creating at least one of glowing areas and street networks on the luminance terrain light map.

3. A method as in claim 2 which includes colorizing selected portions of the luminance terrain light map.

4. A method as in claim 3 which includes incorporating the luminance terrain light map into an out the window display, or, night vision goggles-type display.

5. A method as in claim 4 which includes presenting at least one of the displays as part of a simulation.

6. A method as in claim 3 which includes storing the luminance terrain light map.

7. A method as in claim 3 which includes rendering the luminance terrain light map as a rasterized image.

8. A method as in claim 7 which includes storing the luminance terrain light map.

9. A method as in claim 8 which includes incorporating the luminance terrain light map into at least one of an out the window display, or, night vision goggles-type display.

10. The method of claim 1, wherein identifying a plurality of light point image locations comprises accessing data identifying locations of lights with respect to the region imagery.

11. The method of claim 10, wherein identifying a plurality of light point image locations comprises determining, based on the lineal data, a plurality of road interchange locations in the region imagery, and selecting the plurality of road interchange locations as at least some of the plurality of light point image locations.

12. The method of claim 1, wherein brightening the light pool image region such that the light pool image region is brightened with respect to the other image portions outside of the light pool image region further comprises accessing material data identifying a composition of a surface lit by the light pool image region, and altering an image characteristic of the light pool image region based on the composition.

13. The method of claim 1, wherein brightening the light pool image region such that the light pool image region is brightened with respect to the other image portions outside of the light pool image region further comprises accessing data identifying a light filament type associated with a light located at the light pool image location, determining a filament light color based on the light filament type, and altering an image color of the light pool image region based on the filament light color.

14. A method implemented by computer software encoded on a non-transitory computer readable medium, the method comprising:
   accessing imagery of a region of interest;
   accessing lineal data that identifies a location of a plurality of roads in the imagery;
   accessing area data that identifies a location of a plurality of urban areas in the imagery, the area data identifying a location of at least one building in each of the plurality of urban areas;
   based on the lineal data and the area data, selecting a plurality of imagery portions from the imagery that depicts the plurality of roads and the plurality of urban areas; and
   generating a luminance terrain light map of the region of interest using the plurality of selected imagery portions, by:
      identifying a plurality of light point image locations in the selected imagery portions based on locations of the at least one building in each of the plurality of urban areas, the plurality of light point image locations identifying locations of lights in the respective imagery portions; and
      for each of the plurality of light point image locations:
         defining a light pool image region at the light point image location; and
         brightening the light pool image region such that the light pool image region is brightened with respect to other image portions outside of the light pool image region.

15. A method as in claim 14 which includes:
   establishing a night vision goggles output file.

16. A method as in claim 15 which includes storing the luminance terrain light map on a computer readable medium.

17. A method as in claim 16 which includes storing the night vision goggles output file on the computer readable medium.

18. A method as in claim 17 which includes presenting at least one of the luminance terrain light map on an out the window display device or the night vision goggles output file on night vision goggles.

19. A method as in claim 17 which includes conducting a simulated flight; and
   presenting at least one of the luminance terrain light map on an out the window display device or the night vision goggles output file on night vision goggles.

20. An apparatus, comprising:
   a processor, the processor configured to execute programming instructions to carry out steps comprising:
   accessing region imagery of a region of interest;
   accessing lineal data that identifies a location of a plurality of roads in the region imagery;
   accessing area data that identifies a location of at least one urban area in the region imagery;
   based on the lineal data and the area data, selecting a plurality of spatial areas of imagery from the region imagery that depict the plurality of roads and the at least one urban area; and
   generating a luminance terrain light map of the region of interest using the plurality of selected spatial areas, by:

identifying a plurality of light point image locations in the plurality of selected spatial areas that identify locations of lights in the selected spatial areas; and for each of the plurality of light point image locations:
    defining a light pool image region at the each light point image location; and
    brightening the light pool image region such that the light pool image region is brightened with respect to other image portions outside of the light pool image region.

\* \* \* \* \*